(12) United States Patent
Park et al.

(10) Patent No.: US 11,543,675 B2
(45) Date of Patent: Jan. 3, 2023

(54) ACTUATOR FOR OPTICAL IMAGE STABILIZATION WITH REFLECTOR

(71) Applicant: JAHWA electronics Co., Ltd., Chungcheongbuk-do (KR)

(72) Inventors: chul soon Park, Chungcheongbuk-do (KR); je seung Yeon, Chungcheongbuk-do (KR); in su Kang, Chungcheongbuk-do (KR); hyeonik Cho, Daegu (KR)

(73) Assignee: JAHWA electronics Co., Ltd., Chungcheongbuk-Do (KR)

( * ) Notice: Subject to any disclaimer, the term of this patent is extended or adjusted under 35 U.S.C. 154(b) by 158 days.

(21) Appl. No.: 17/194,521

(22) Filed: Mar. 8, 2021

(65) Prior Publication Data

US 2022/0229310 A1 Jul. 21, 2022

(30) Foreign Application Priority Data

Jan. 21, 2021 (KR) .......................... 10-2021-0008506

(51) Int. Cl.
*G02B 27/64* (2006.01)
*G02B 7/182* (2021.01)
*G03B 5/00* (2021.01)

(52) U.S. Cl.
CPC ........... *G02B 27/646* (2013.01); *G02B 7/182* (2013.01); *G03B 5/00* (2013.01); *G03B 2205/0023* (2013.01); *G03B 2205/0069* (2013.01)

(58) Field of Classification Search
CPC ........ G02B 27/646; G02B 7/182; G02B 7/18; G02B 7/1805; G02B 7/1821; G02B 7/1822; G03B 5/00; G03B 2205/0023; G03B 2205/0069; G03B 2217/005; G03B 2205/00; G03B 2205/0007; G03B 13/36; H04N 5/23248; H04N 5/23264; H04N 5/2328; H04N 5/23283
USPC ........... 359/555, 554, 556; 250/201.1, 201.2, 250/201.4; 348/208.99, 208.2, 208.12, 348/208.4, 208.7, 208.8, 208.11; 396/52, 396/55
See application file for complete search history.

(56) References Cited

U.S. PATENT DOCUMENTS

| 10,488,631 | B2 * | 11/2019 | Bachar .................. | G02B 7/005 |
| 2018/0239161 | A1 * | 8/2018 | Seol ..................... | G02B 27/646 |
| 2019/0129197 | A1 * | 5/2019 | Kim ...................... | G03B 17/17 |
| 2022/0091365 | A1 * | 3/2022 | Park ..................... | G02B 7/1821 |

* cited by examiner

*Primary Examiner* — Arnel C Lavarias
(74) *Attorney, Agent, or Firm* — The PL Law Group, PLLC

(57) ABSTRACT

An actuator for a reflector may include a carrier having a first groove rail at the rear, a first magnet above the carrier, a middle guide having a first guide rail to face the groove rail and having a second groove rail of a track shape at the rear, a first ball between the first groove rail and the first guide rail, a second magnet at the rear of the middle guide, a base having a second guide rail to face the second groove rail and the middle guide, a second ball between the second groove rail and the second guide rail, a circuit board with a first coil and a second coil, a pulling yoke at the front of the middle guide, and a pulling magnet at the rear of the carrier to face the pulling yoke and to generate an attractive force to the pulling yoke.

7 Claims, 7 Drawing Sheets

ACTUATOR FOR OPTICAL IMAGE STABILIZATION WITH REFLECTOR

CROSS-REFERENCE TO RELATED APPLICATION(S)

This application claims the benefit under 35 USC § 119(a) of Korean Patent Application No. 10-2021-0008506, filed on Jan. 21, 2021, in the Korean Intellectual Property Office, the entire disclosure of which is incorporated herein by reference for all purposes.

BACKGROUND

1. Technical Field

The present disclosure relates to an actuator for a reflector, and more specifically, to an actuator for a reflector, which implements OIS (Optical Image Stabilization) by driving a reflector, which changes a light path, in a perpendicular direction.

2. Description of Related Art

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

One typical method for implementing the AF or OIS function is to install a magnet (a coil) on a mover (a carrier) and install a coil (a magnet) on a stator (a housing, or another type of carrier, or the like), and then generate an electromagnetic force between the coil and the magnet so that the mover moves in the optical axis direction or in a direction perpendicular to the optical axis.

Recently, a mobile terminal is equipped with a zoom lens that has specifications for variably adjusting a focal length or capture an image from a distance in order to meet the increased user needs and implement user convenience in a more diverse manner.

The zoom lens has a structure in which a plurality of lenses or lens groups are arranged side by side, or has a characteristic that the lens has a long optical axis direction, so a larger mounting space must be provided in the mobile terminal.

Recently, in order to organically graft the physical characteristics of the zoom lens with the geometric characteristics of a portable terminal, an actuator or camera module having a physical structure that allows the light of a subject to be refracted using a reflector placed in front of the lens has been disclosed.

The actuator or the like employing a reflector does not correctively move the lens when shaking occurs, but implements OIS by moving the reflector, which reflects the light of the subject, toward the lens in one or two axes.

Typically, a guide rail is formed on a moving body and a fixed body, and a plurality of balls are disposed therebetween so that the moving body rotates along the guide rail while being supported by the balls.

However, in the case of such a conventional device, since the movement of the reflector must be implemented independently based on two directions (X and Y axes) perpendicular to the optical axis (Z axis), the structure is quite complicated and it is difficult to maintain driving precision.

In addition, when the moving body is physically supported and guided by the balls, it is common to add a yoke structure so that the subject in contact with the balls is closely adhered to the balls. However, in the case of the conventional device, since the movement in each direction (X axis and/or Y axis) is performed by a complex physical structure, it is difficult to implement the yoke structure itself, and also the movement is generally implemented by adding a separate configuration.

Therefore, the efficiency of the assembly process is lowered, and also independent movements in each direction that must be precisely implemented are likely to interfere with each other. In addition, in order to avoid this phenomenon, another physical configuration or structure must be additionally installed, which however deteriorates space utilization extremely.

SUMMARY

The present disclosure is designed to solve the problems of the related art, and therefore the present disclosure is directed to providing an actuator for a reflector, which may further improve the precision according to a rotational movement of a carrier to which a reflector is mounted, by improving a physical structure for implementing movement in each direction and a structure for closely adhering a moving body and a fixed body with balls being interposed therebetween.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an actuator for a reflector, comprising: a carrier having a first groove rail formed at the rear thereof and configured so that a reflector is installed at the front thereof; a first magnet provided above the carrier based on an optical axis direction; a middle guide having a first guide rail formed at the front thereof to face the groove rail and having a second groove rail of a track shape formed at the rear thereof; a first ball disposed between the first groove rail and the first guide rail; a second magnet provided at the rear of the middle guide; a base having a second guide rail formed to face the second groove rail and configured to face the middle guide; a second ball disposed between the second groove rail and the second guide rail; a circuit board equipped with a first coil configured to face the first magnet and a second coil configured to face the second magnet; a pulling yoke provided at the front of the middle guide; and a pulling magnet provided at the rear of the carrier to face the pulling yoke and configured to generate an attractive force to the pulling yoke.

In this case, the second magnet of the present disclosure is preferably provided in a direction perpendicular to the first magnet.

In addition, the middle guide of the present disclosure may be configured to rotate based on the base while facing the base in a plane-to-plane manner.

Preferably, the first groove rail of the present disclosure may be formed at both sides of the carrier, respectively, and in this case, the pulling magnet may be provided in the middle of the first groove rails.

In addition, the actuator for a reflector according to the present disclosure may further comprise a first back yoke disposed between the first magnet and the carrier and having a first wall formed adjacent to the second magnet or a second back yoke disposed between the second magnet and the middle guide and having a second wall formed adjacent to the first magnet.

In an embodiment, the actuator for a reflector according to the present disclosure may further comprise a protruding guider provided at any one of the rear of the carrier and the front of the middle guide; and a guider groove portion provided at the other one of the rear of the carrier and the front of the middle guide where the protruding guider is not provided, the guider groove portion being configured to accommodate the protruding guider.

According to an embodiment of the present disclosure, since physical structures for implementing movement in each direction are organically combined with each other, the motion relationship for moving the reflector in each direction may be implemented in a simpler structure, thereby further enhancing the space utilization of the actuator and also further improving the driving precision in each direction.

According to another embodiment of the present disclosure, since the configuration for closely adhering the carrier and the middle guide to each other may be implemented in a simpler structure without any other physical member or structure, interference caused by movement in each direction may be fundamentally prevented, and it is possible to more effectively restore a reference position of the carrier based on the middle guide.

According to still another embodiment of the present disclosure, since the electromagnetic fields for implementing the movement in each direction are arranged to be orthogonal to each other and also the physical structure of the back yoke for concentrating magnetic force is improved, the independence of movement in each direction may be more effectively implemented, and the magnetic influence between adjacent magnets may be more effectively blocked.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
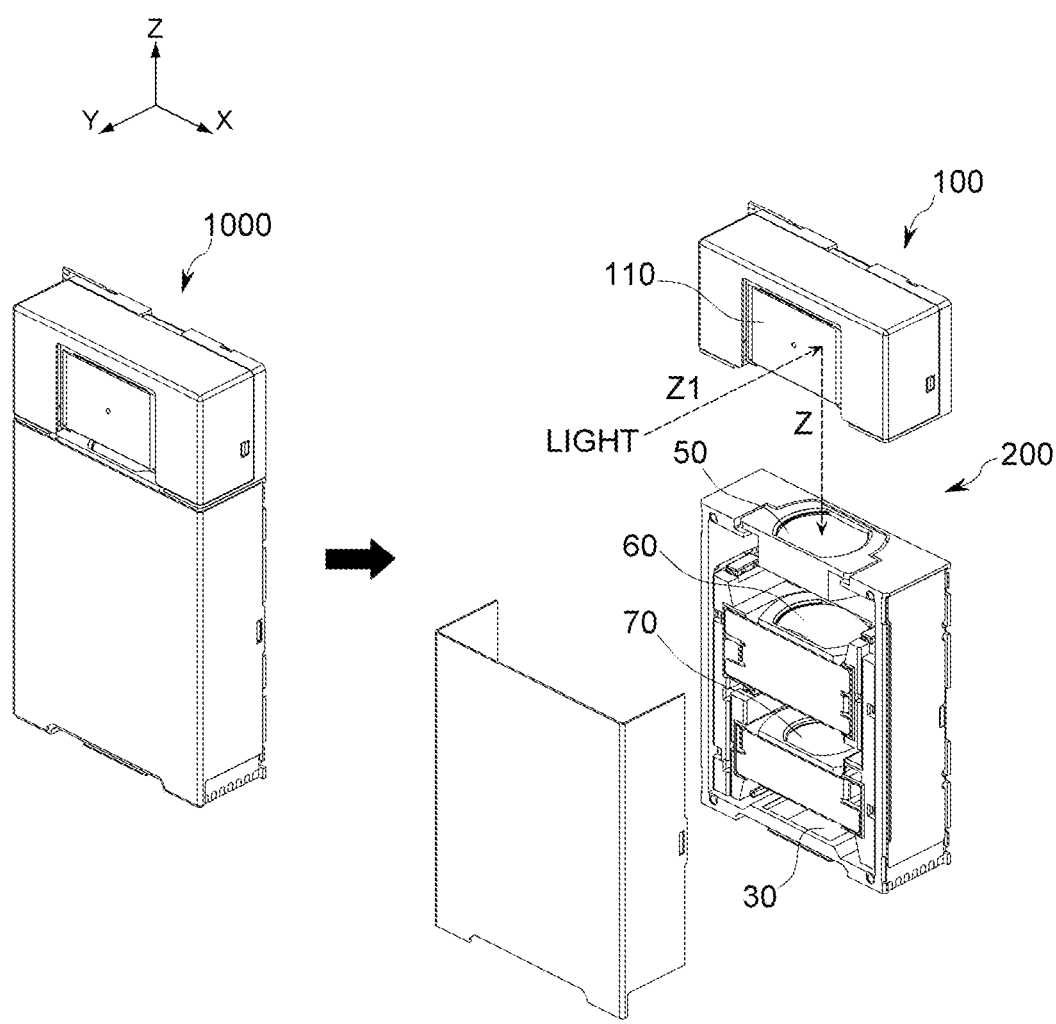
FIG. 1 is a diagram showing an overall configuration of an actuator according to an embodiment of the present disclosure and a camera module.

FIG. 1 is a diagram for illustrating an overall configuration of an actuator 100 for a reflector (hereinafter, referred to as an 'actuator') according to an embodiment of the present disclosure and a camera module 1000 including the actuator.

The actuator 100 of the present disclosure may be implemented as a single device, and as shown in FIG. 1, may also be implemented in the form of a camera module 1000 equipped with at least one lens 50, 60, 70 and including a lens driving module 200 for zooming or autofocusing, an image sensor 30 and the like.

According to the present disclosure, the light of a subject does not flow directly into the lens 50 (or the like), but the light is introduced after the path of light is changed by means of a reflector 110 provided in the actuator 100 of the present disclosure (by refraction, reflection, or the like).

As shown in FIG. 1, the path of light entering from the outside is Z1, and the path of light introduced into the lens 50 after being refracted or reflected by the reflector 110 is Z.

In the following description, a Z-axis direction corresponding to a direction in which light is introduced into the lens 50 will be referred to as an optical axis or an optical axis direction, and two directions perpendicular thereto will be referred to as an X axis and a Y axis. In addition, based on the position and direction of the actuator 100 of the present disclosure shown in FIG. 1, a positive Y-axis direction will be referred to as a front side or a front surface, and a negative Y-axis direction will be referred to as a rear side or a rear surface.

Based on the optical axis direction, the image sensor 30 such as CCD or CMOS that converts a light signal into an electrical signal may be provided at a rear end of the lens driving module 200, and a filter that blocks or transmits a light signal of a specific frequency band may be provided thereto.

As will be described in detail later, when shaking occurs due to hand shaking or the like based on the X-axis direction or/and the Y-axis direction perpendicular to the optical axis, the actuator 100 of the present disclosure corresponds to a device that implements OIS in the X-axis direction or/and the Y-axis direction by rotating the reflector 110 in a direction to compensate for the motion.

Even though the drawings show an embodiment in which image stabilization in the X-axis direction and the Y-axis direction is performed integrally, this is only an example. Depending on an embodiment, it is also possible that only a structure for image stabilization in any one of the X-axis direction and the Y-axis direction is applied, and image stabilization in the other direction is implemented by linearly moving a carrier equipped with the lenses 60, 70.

Figure 2:
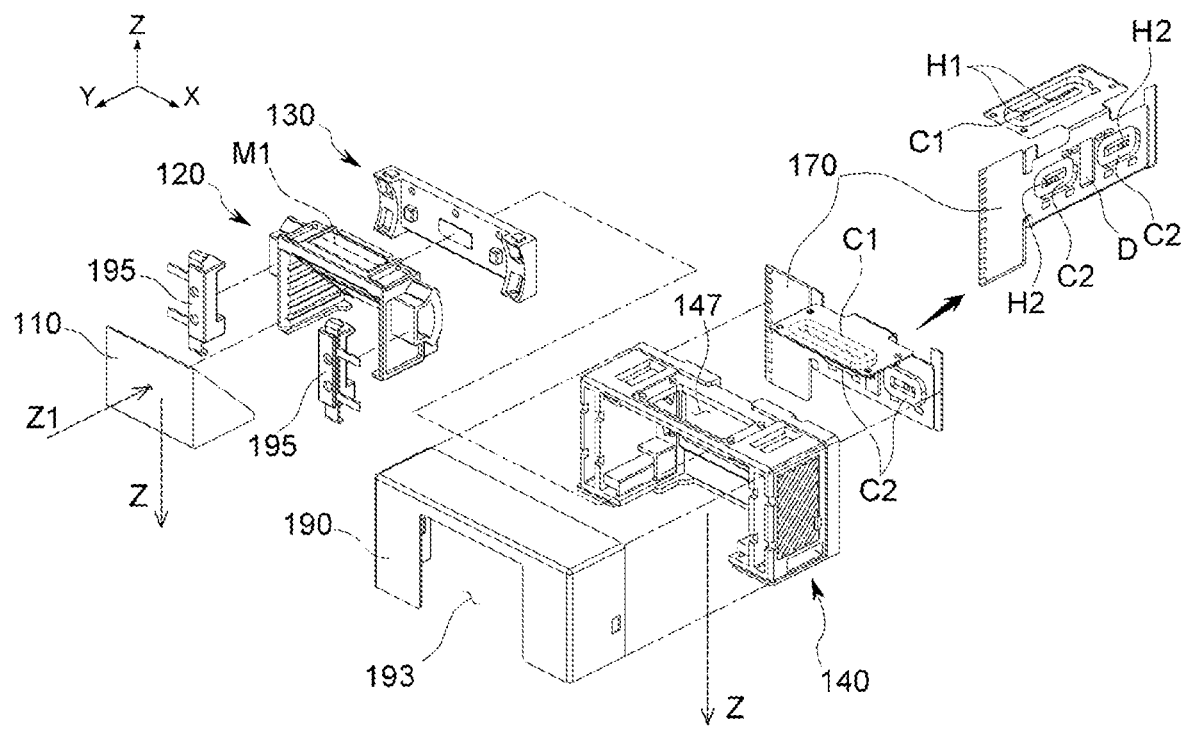
FIG. 2 is an exploded view showing a detailed configuration of the actuator according to an embodiment of the present disclosure and a camera module.

FIG. 2 is an exploded view showing a detailed configuration of the actuator 100 according to an embodiment of the present disclosure.

As shown in FIG. 2, the actuator 100 of the present disclosure may be configured to include a case 190 functioning as a shield can, a reflector 110, a carrier 120, a middle guide 130, and a base 140.

First, the overall configuration of the actuator 100 will be described first with reference to FIG. 2, and the detailed configuration and driving relationship of the actuator 100 for OIS driving in each direction will be described later.

As shown in FIG. 2, when the light of a Z1 path enters the actuator 100 of the present disclosure through an open portion 193 of the case 190, the reflector 110 of the present disclosure changes (refracts, reflects, or the like) the path of the introduced light to the optical axis direction (Z) and introduces the light toward the lens driving module 200.

The reflector 110 may be any one selected from mirrors and prisms, or a combination thereof, and further, the reflector 110 may be implemented using various members capable of changing light introduced from the outside to the optical axis direction.

Since the present disclosure is configured to allow light to flow into the lens driving module 200 after the path of light is refracted by the reflector 110 as described above, the lens driving module 200 does not need to be installed in a thickness direction of a mobile terminal. Thus, even if an optical member having a long physical characteristic in the optical axis direction like a zoom lens is mounted to a portable terminal, the thickness of the portable terminal is not increased. This may be optimized for miniaturization of the portable terminal.

As well known in the art, the OIS driving is implemented by moving a lens in a direction to compensate for shaking caused by hand shaking. However, in the embodiment of the present disclosure, the OIS driving is implemented by moving the reflector 110, unlike the above method in which the lens or the like is reverse-moved.

The reflector 110 of the present disclosure is installed in a direction facing the open portion 193 of the case 190 to which light is introduced from the actuator 100, namely toward a front surface in the Y-axis direction, based on the embodiment shown in FIG. 2.

The reflector 110 is installed at the front of the carrier 120 as shown in FIG. 2 or the like, and the carrier 120 is physically supported by the middle guide 130 and rotates with respect to the middle guide 130.

As will be described later, if the carrier 120 of the present disclosure rotates with respect to the middle guide 130 (based on the YZ plane), the reflector 110 installed at the carrier 120 also rotates in the same direction, and the path of light introduced to the image sensor is shifted to the Y-axis direction due to the rotation of the reflector 110, thereby compensating for hand shaking in the Y-axis direction.

In the following description, the rotating direction based on the YZ plane in relation to the image stabilization in the Y-axis direction will be referred to as a first direction, and, as will be described later, the face-to-face rotating direction with respect to the XZ plane in relation to the image stabilization in the X-axis direction will be referred to as a second direction.

The carrier 120 of the present disclosure corresponds to a moving body in relation to the movement in the first direction, and the middle guide 130 of the present disclosure corresponds to a fixed body from a corresponding point of view.

A first magnet M1 is provided above the carrier 120 based on the optical axis direction, and a first coil C1 is disposed to face the first magnet M1. If a power of an appropriate magnitude and direction is applied to the first coil C1, an electromagnetic force is generated between the first coil C1 and the first magnet M1, and the carrier 120 rotates due to the generated electromagnetic force.

The first coil C1 is implemented to be mounted to a circuit board 170, and as shown in the figures, the circuit board 170 may have a first hall sensor H1 that detects a Y-axis position of the reflector 110, specifically a position of the first magnet M1 or the like, using a hall effect.

If an electrical signal of the first hall sensor H1 is input, an operation driver D controls the power of a magnitude and direction corresponding to the input signal of the first hall sensor H1 to be applied to the first coil C1.

As described later, a first groove rail 121 facing the first guide rail 133 formed at the middle guide 130 is formed at the rear of the carrier 120 of the present disclosure, and a first ball B1 is disposed between the first groove rail 121 and a first guide rail 133.

Meanwhile, the middle guide 130 is physically supported by the base 140 to rotate based on the base 140 (based on the XZ plane).

Since the carrier 120 at which the reflector 110 is installed is mounted to the middle guide 130 with the first ball B1 being interposed therebetween as described above, if the middle guide 130 rotates based on the XZ plane, namely based on the Y-axis direction as an axial direction RA (see FIG. 7), the reflector 110 also rotates in the same direction along with the physical movement.

If the reflector 110 rotates in the second direction as above, the path of light introduced to the image sensor is shifted to the X-axis direction, thereby compensating for the shaking in the X-axis direction.

In this regard, based on the rotational movement for the image stabilization in the X-axis direction (the rotational movement in the second direction), the middle guide 130 of the present disclosure corresponds to a moving body, and from a corresponding point of view, the base 140 functions as a fixed body. Therefore, the middle guide 130 of the present disclosure corresponds to a moving body in the X-axis directional OIS but corresponds to a fixed body in the Y-axis directional OIS.

A second magnet M2 is mounted at the rear of the middle guide 130 (see FIG. 3), and a second coil C2 is disposed to face the second magnet M2. If an electrical signal of the second hall sensor H2 corresponding to the direction and magnitude of the magnetic force of the second magnet M2 is input to the operation driver D, the operation driver D is controlled to apply a power of appropriate magnitude and direction to the second coil C2.

If a power is applied to the second coil C2, a magnetic force is generated at the second magnet M2, and the middle guide 130 rotates based on the XZ plane due to the generated magnetic force.

As shown in FIG. 2, the first magnet M1 may be configured to be exposed to the first coil C1 through an opening 147 formed in an upper portion of the base 140 (based on the Z axis) so that the magnetic force between the first coil C1 and the first magnet M1 may be enhanced.

In addition, by configuring the magnetic force for driving in each direction to be orthogonal, it is preferable that the first magnet M1 installed above the carrier 120 and that the second magnet M2 at the rear of the middle guide 130 are disposed perpendicular to each other in order to minimize the effect of the magnetic force in each direction on the magnetic force in the other direction. In addition, to correspond to this structure, the first coil C1 and the second coil C2 are mounted to be perpendicular to each other on the circuit board 170 that is implemented as a flexible circuit board or the like.

Depending on an embodiment, a damper 195 for absorbing an external shock or the like may be provided to the base 140 as illustrated in FIG. 2.

Hereinafter, a detailed configuration of the present disclosure for implementing the OIS in the Y-axis direction by rotating the carrier 120 in the first direction based on the middle guide 130 will be described in detail with reference to the accompanying drawings.

The first magnet M1 facing the first coil C1 is installed above the carrier 120, at the front of which the reflector 110 is installed. According to an embodiment, a first back yoke 180-1 is preferably provided between the first magnet M1 and the carrier 120, namely in an opposite direction in which the first magnet M1 faces the first coil C1, so that the electromagnetic force between the first coil C1 and the first magnet M1 may be enhanced.

Figure 3:
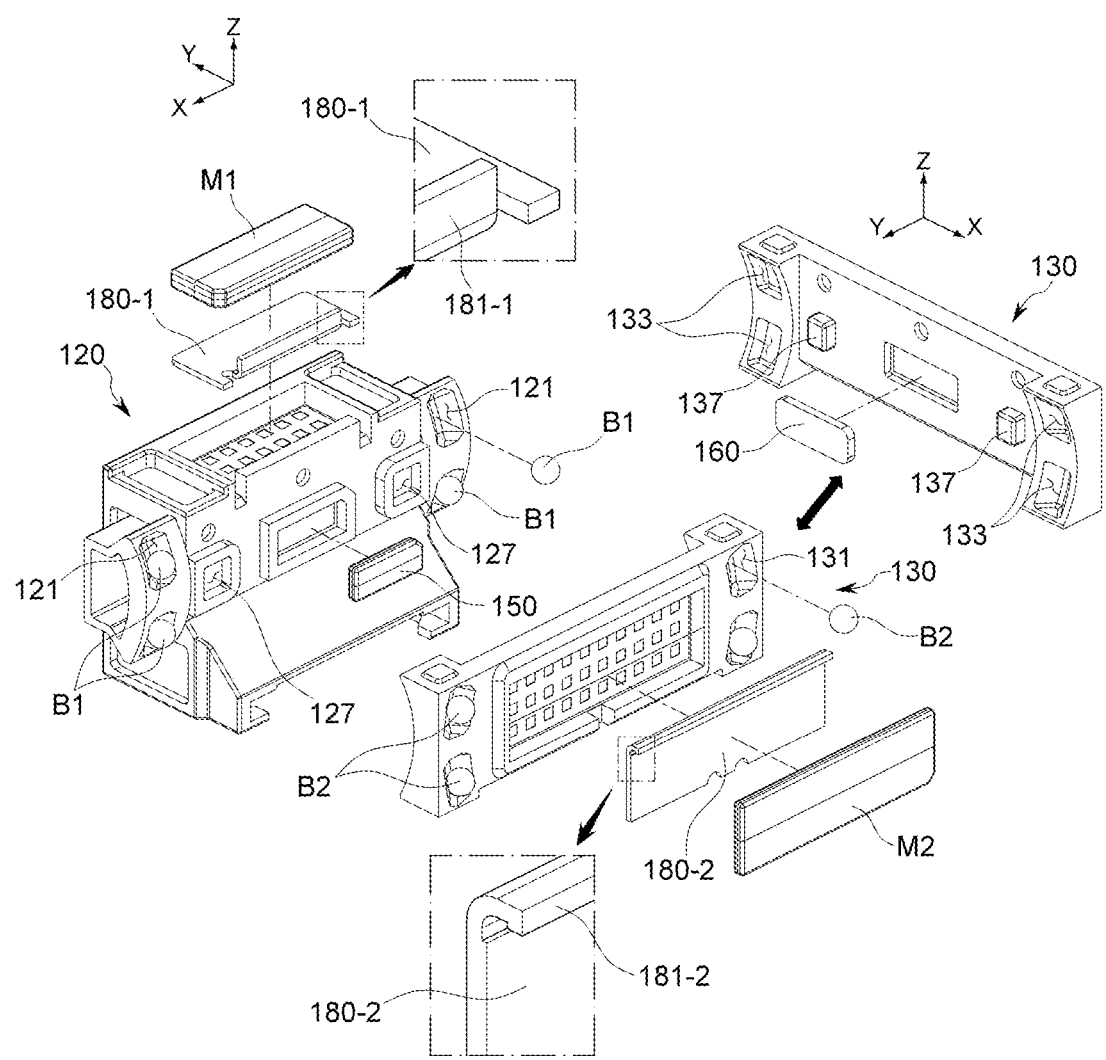
FIGS. 3 and 4 are diagrams showing a detailed configuration of a carrier and a middle guide of the present disclosure.

In this case, as shown in the upper enlarged view of FIG. 3, it is preferable that a first wall 181-1 having a bent shape is formed in a portion of the first back yoke 180-1 adjacent to the second magnet M2.

In this configuration, the influence of the magnetic force between the first magnet M1 and the second magnet M2 may be more effectively blocked, in addition to the positional configuration in which the first magnet M1 and the second magnet M2 are orthogonal to each other.

In a corresponding point of view, a second back yoke 180-2 disposed between the second magnet M2 and the middle guide 130 also preferably has a second wall 181-2 formed in a portion adjacent to the first magnet M1.

As shown in FIG. 3, the first groove rail 121 formed at the rear of the carrier 120 has a rounded shape, and the first guide rail 133 having a corresponding shape is formed at the front of the middle guide 130.

The first ball B1 may be disposed between the first groove rail 121 and the first guide rail 133 as shown in FIG. 3, and the first ball B1 may be provided to be partially accommodated in at least one of the first groove rail 121 or/and the first guide rail 133 so as to effectively guide the rotational movement.

In this case, the carrier 120 may move more flexibly and linearly with a minimized frictional force due to the moving and rolling of the first ball B1 while maintaining an appropriate distance from the middle guide 130 by means of the first ball B1, thereby reducing noise and minimizing the driving force required for the movement of the carrier 120.

In order to implement the movement in the first direction more stably, the first groove rail 121 is preferably formed to be symmetrical to both sides of the carrier 120.

Figure 4:
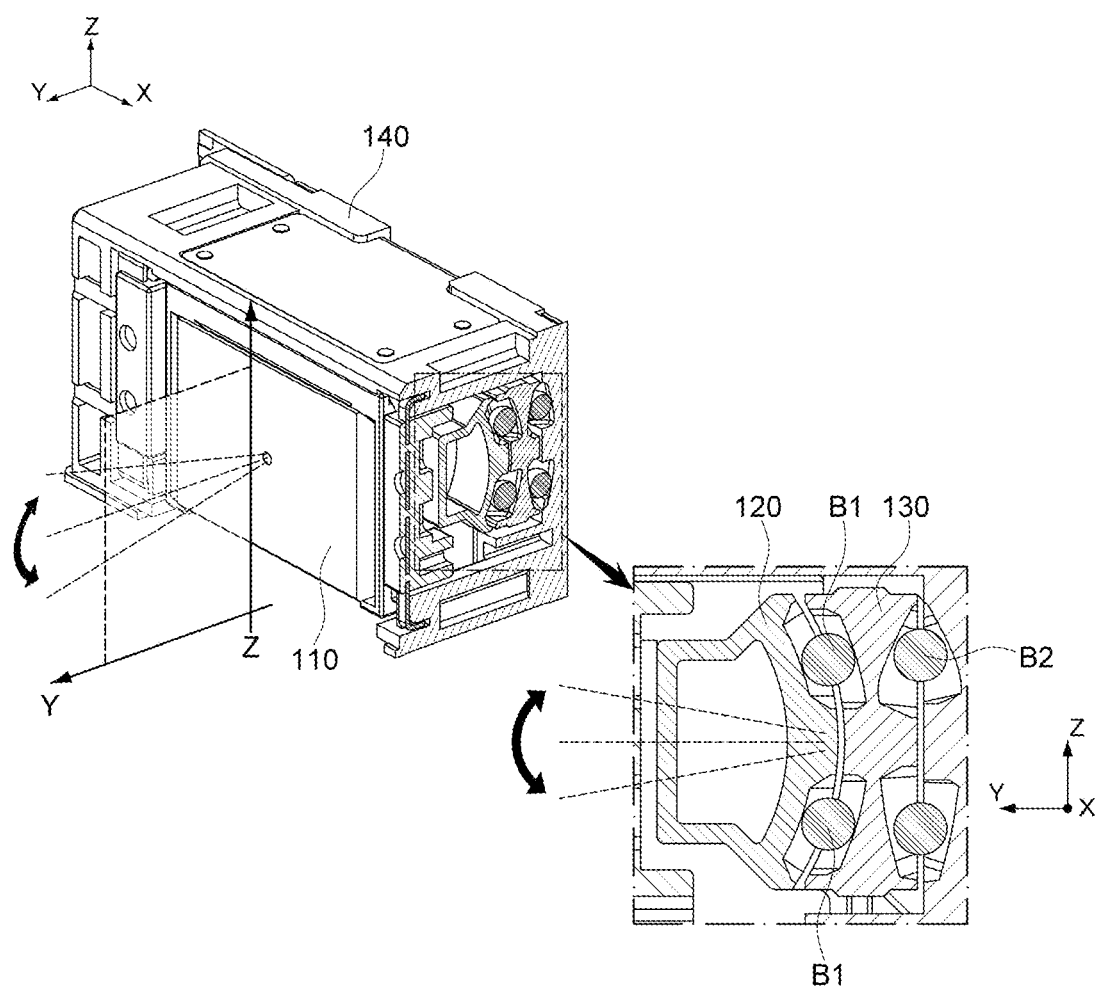

In this configuration, as shown in FIG. 4, the carrier 120 to which the reflector 110 is mounted rotates in the first direction (based on the YZ plane) based on the middle guide 130 by physical guiding of the first ball B1, the first groove rail 121 and the first guide rail 133.

Meanwhile, as shown in FIG. 3, a pulling magnet 150 is provided at the rear of the carrier 120, and a pulling magnet 150 facing the pulling magnet 150 and made of a metal material to generate an attractive force to the pulling magnet 150 is provided at the front of the middle guide 130.

Since the carrier 120 is pulled toward the middle guide 130 due to the attractive force generated between the pulling yoke 160 and the pulling magnet 150, the point-contact between the carrier 120 and the first ball B1 and between the first ball B1 and the middle guide 130) may be maintained continuously.

The pulling magnet 150 is preferably provided in the middle of the first groove rails 121 respectively formed at both sides of the carrier 120.

In this configuration, since the attractive force between the pulling magnet 150 and the pulling yoke 160 is applied in a balanced and even manner, it is possible to induce the attractive force on the plurality of first balls B1 not to be biased to a specific first ball B1, thereby improving the driving precision. In addition, when the power applied to the first coil C1 is terminated, it is possible to more effectively restore the carrier 120 to a default position.

Depending on an embodiment, it is also possible that a protruding guider 137 is provided at any one of the rear of the carrier 120 and the front of the middle guide 130 and a guide groove 127 is provided at the other of the rear of the carrier 120 and the front of the middle guide 130, where the protruding guider 137 is not provided, so that the protruding guider 137 is accommodated therein.

In this configuration, the rotational movement of the carrier 120 may be physically guided more effectively, and the rotational movement of the carrier 120 may be effectively limited to a specific range.

Since the protruding guider 137 and the guide groove 127 of the present disclosure described above, as well as the pulling magnet 150 and the pulling yoke 160, are provided at the portions the carrier 120 and the middle guide 130 which face each other, the volume increase may be effectively suppressed and the space utilization may be further improved.

Figure 5:
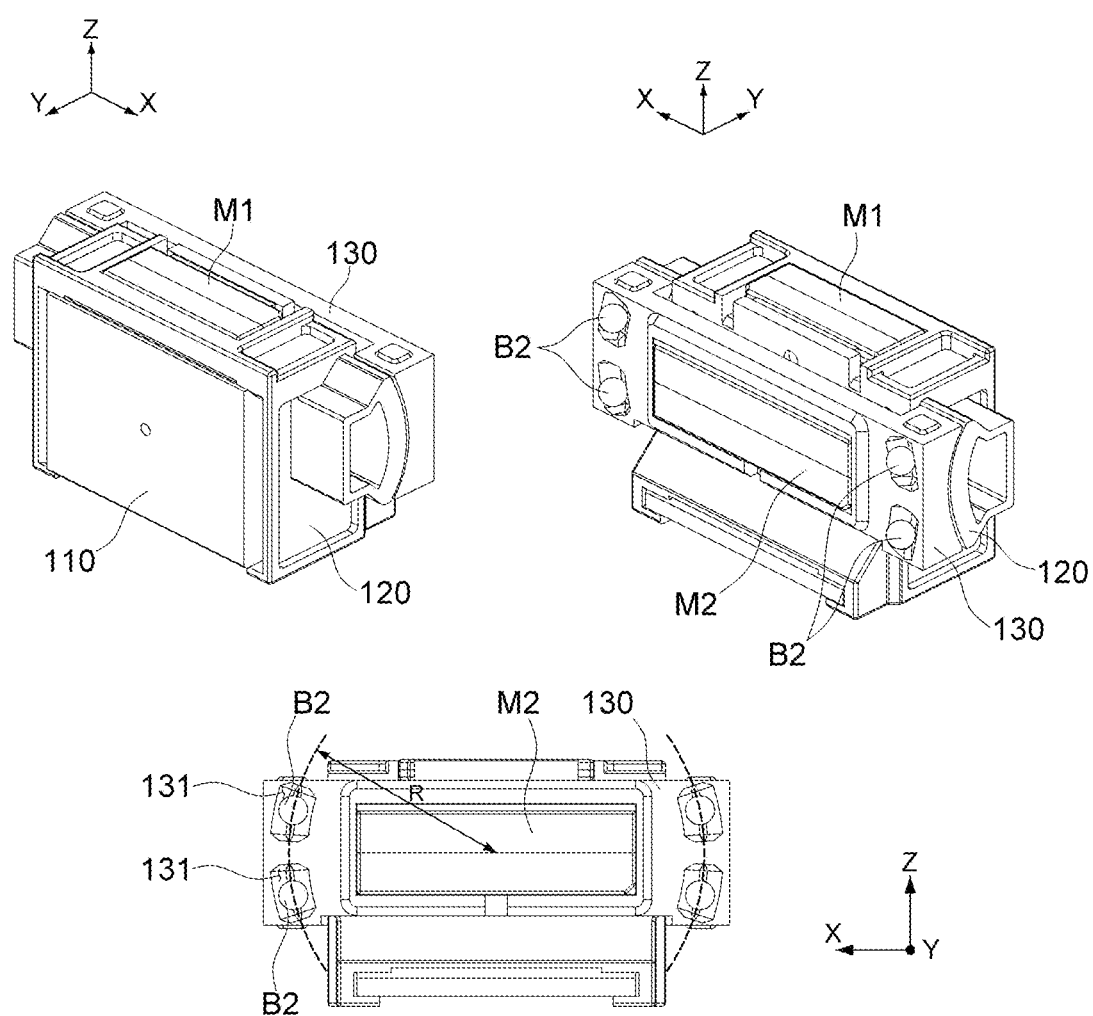
FIGS. 5 to 7 are diagrams showing a detailed configuration of a middle guide and a base of the present disclosure.
Figure 6:
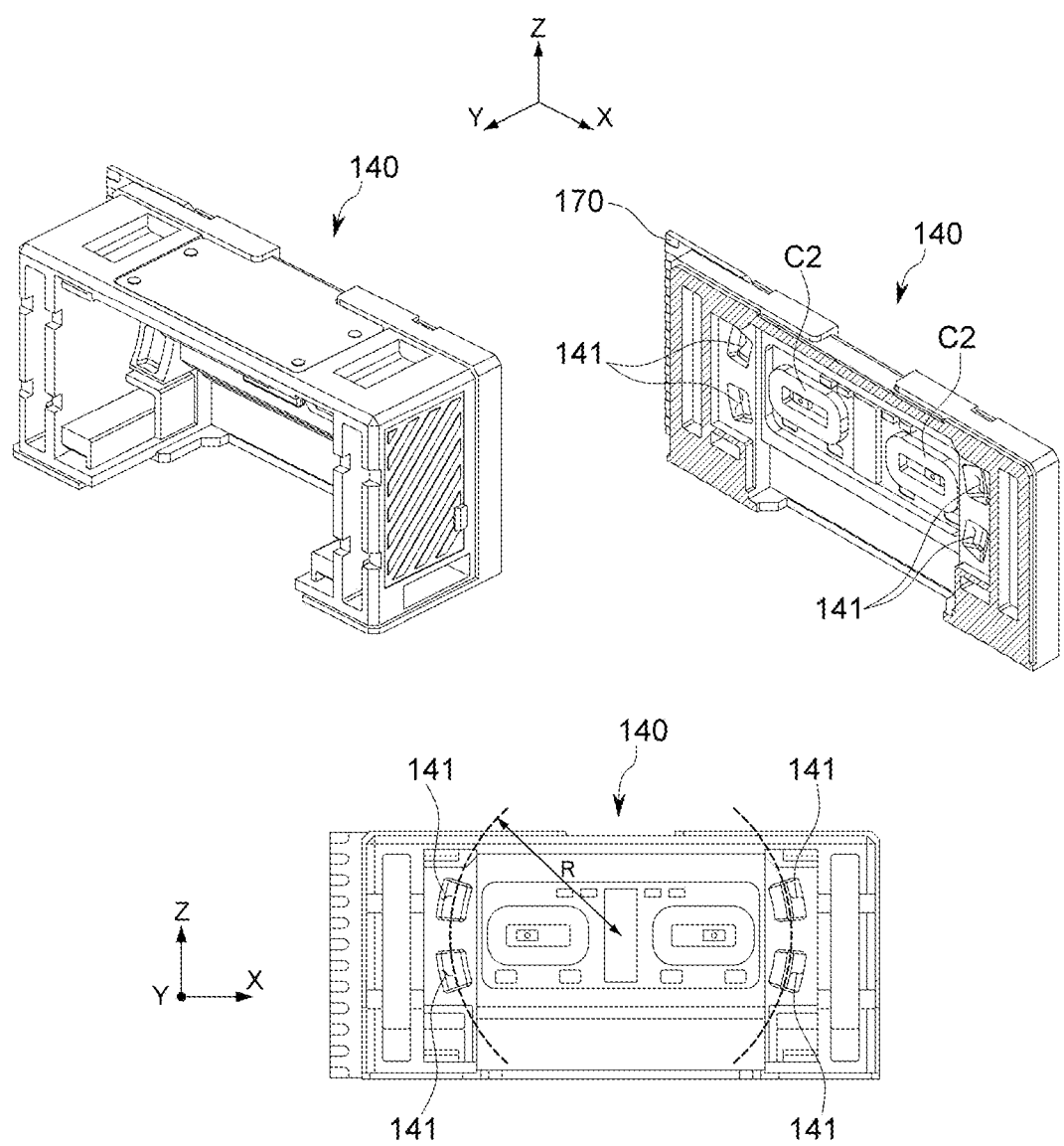
Figure 7:
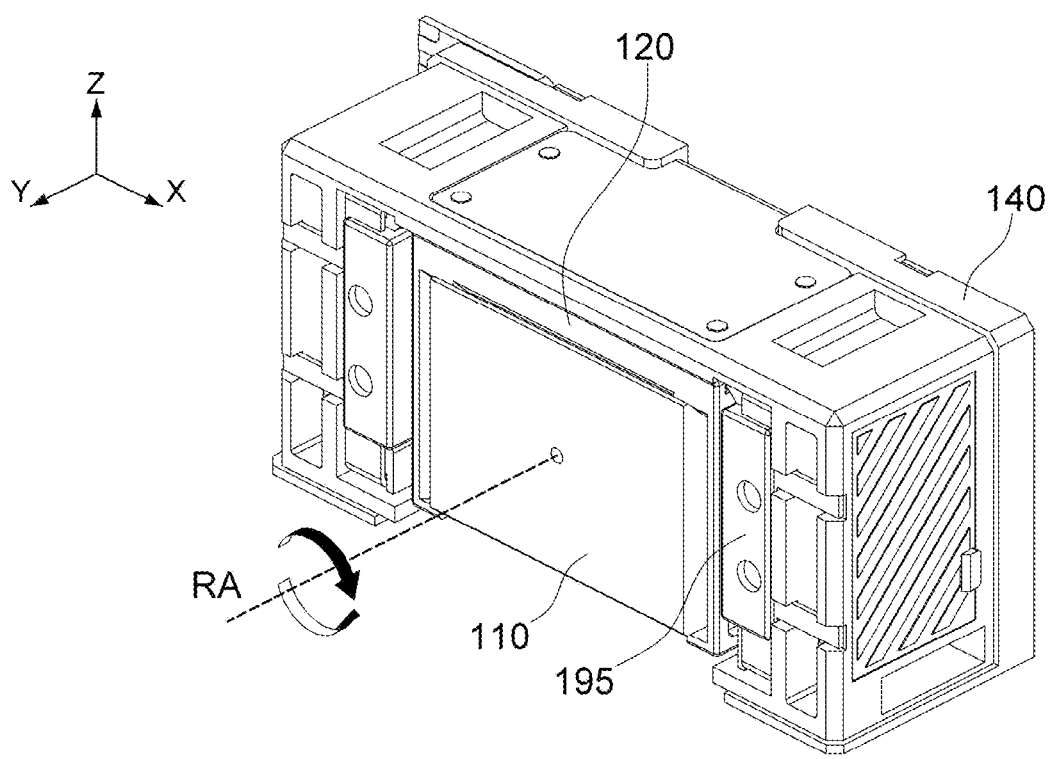

FIGS. 5 to 7 are diagrams showing a detailed configuration of the middle guide 130 and the base 140 of the present disclosure.

Hereinafter, a specific configuration of the present disclosure that implements the OIS in the X-axis direction by rotating the middle guide 130 in the second direction based on the base 140 will be described in detail with reference to the accompanying drawings. As shown in the figures, a second groove rail 131 having a track shape as a whole is formed at the rear of the middle guide 130, and a second guide rail 141 having a shape corresponding to the second groove rail 131 is formed at the front of the base 140.

A second ball B2 disposed between the middle guide 130 and the base 140 is arranged to be partially accommodated in the second groove rail 131 or/and the second guide rail 141.

The second groove rail 131 and the second guide rail 141 have a rounded track shape with a curvature radius (R) based on the XZ plane as shown in the figures.

Even though four guide rails 131 and four groove rails 141 are shown in the figures to be separated from each other, this is only an example, and they may be provided in different numbers.

Since the second groove rail 131 and the second guide rail 141 forming a track shape based on the XZ plane are provided at the rear of the middle guide 130 and at the front of the base 140 as above, the middle guide 130 of the present disclosure rotates based on the base 140 while facing the base 140 in a plane-to-plane manner.

As described above, the first groove rail 121 formed at the carrier 120 and the first guide rail 133 formed at the front of the middle guide 130 have a rail structure in a direction different from the second groove rail 131 described above.

Therefore, if the middle guide 130 rotates in the second direction, the physical driving force of the middle guide 130 is transmitted to the carrier 120 as it is. Thus, if the middle guide 130 rotates in a plane-to-plane manner based on the base 140, the reflector 110 is also rotates based on the Y axis as a rotation axis (RA) as shown in FIG. 4, thereby implementing image stabilization in the X-axis direction component.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a reflector, comprising:
    a carrier having a first groove rail formed at a rear thereof and configured so that a reflector is installed at a front thereof;
    a first magnet provided above the carrier based on an optical axis direction;
    a middle guide having a first guide rail formed at a front thereof to face the first groove rail and having a second groove rail of a track shape formed at a rear thereof;
    a first ball disposed between the first groove rail and the first guide rail;
    a second magnet provided at the rear of the middle guide;
    a base having a second guide rail formed to face the second groove rail and configured to face the middle guide;
    a second ball disposed between the second groove rail and the second guide rail;
    a circuit board equipped with a first coil configured to face the first magnet and a second coil configured to face the second magnet;
    a pulling yoke provided at the front of the middle guide; and
    a pulling magnet provided at the rear of the carrier to face the pulling yoke and configured to generate an attractive force to the pulling yoke.

2. The actuator for a reflector according to claim 1, wherein the second magnet is provided in a direction perpendicular to the first magnet.

3. The actuator for a reflector according to claim 1, wherein the middle guide rotates based on the base while facing the base in a plane-to-plane manner.

4. The actuator for a reflector according to claim 1, wherein the first groove rail is formed at both sides of the carrier, respectively, and
    wherein the pulling magnet is provided in the middle of the first groove rails.

5. The actuator for a reflector according to claim 1, further comprising:
    a first back yoke disposed between the first magnet and the carrier and having a first wall formed adjacent to the second magnet.

6. The actuator for a reflector according to claim 1, further comprising:
    a second back yoke disposed between the second magnet and the middle guide and having a second wall formed adjacent to the first magnet.

7. The actuator for a reflector according to claim 1, further comprising:
    a protruding guider provided at any one of the rear of the carrier and the front of the middle guide; and
    a guider groove portion provided at the other one of the rear of the carrier and the front of the middle guide where the protruding guider is not provided, the guider groove portion being configured to accommodate the protruding guider.

* * * * *